US008215193B2

(12) United States Patent
Duff (10) Patent No.: US 8,215,193 B2
(45) Date of Patent: *Jul. 10, 2012

(54) METHOD AND APPARATUS FOR SIMPLIFIED AND HYGIENIC ACCESS TO A FLUID CHAMBER

(76) Inventor: Alan John Duff, Sevenoaks (GB)

( * ) Notice: Subject to any disclaimer, the term of this patent is extended or adjusted under 35 U.S.C. 154(b) by 322 days.

This patent is subject to a terminal disclaimer.

(21) Appl. No.: 12/560,884

(22) Filed: Sep. 16, 2009

(65) Prior Publication Data

US 2010/0003072 A1  Jan. 7, 2010

Related U.S. Application Data

(63) Continuation-in-part of application No. 11/538,117, filed on Oct. 3, 2006, now Pat. No. 7,607,364.

(51) Int. Cl.
*G01D 21/00* (2006.01)
(52) U.S. Cl. ...................................................... 73/866.5
(58) Field of Classification Search ............... 73/866.5, 73/863.85, 86, 756; 374/208, 148
See application file for complete search history.

(56) References Cited

FOREIGN PATENT DOCUMENTS
WO  WO 9705459 A1 *  2/1997
* cited by examiner

*Primary Examiner* — Hezron E Williams
*Assistant Examiner* — Tamiko Bellamy
(74) *Attorney, Agent, or Firm* — Coats & Bennett, PLLC (57) ABSTRACT

A hygienic insert connector assembly that prevents biological contamination within food, beverage and biopharma processes includes an insert to pass through an opening into a fluid chamber, a support assembly, a seal disposed around the insert to seal the opening into the fluid chamber, and a seal compression mechanism. When the seal is axially compressed, the seal radially expands and contacts both the wall of the opening into the fluid chamber and the insert to collectively form a fluid tight seal. This eliminates the potential for product entrapment with the associated biological contamination risk, and allows efficient in-place cleaning and sterilization. The connector assembly can be installed in any orientation and functions such that positive pressure inside the fluid chamber enhances the sealing mechanism. The simple design enables the insert to be easily removed, examined, and re-inserted in conformance with international sanitary design standards.

23 Claims, 5 Drawing Sheets

METHOD AND APPARATUS FOR SIMPLIFIED AND HYGIENIC ACCESS TO A FLUID CHAMBER

RELATED APPLICATIONS

This application is a continuation-in-part of, and claims priority from, co-pending U.S. application Ser. No. 11/538,117. The '117 application, which is entitled "Method and Apparatus for Simplified Hygienic Access to a Fluid Chamber," was filed on Oct. 3, 2006, and is incorporated herein by reference in its entirety.

FIELD OF THE INVENTION

The present invention relates to devices for permitting simplified and hygienic access to the interior of fluid chambers.

BACKGROUND

Operations involving the handling and processing of fluids entail fluids being contained in various types of fluid chambers. As used herein, the term fluid refers to any process material that is of a sufficiently flowable nature and may include, but is not limited to, a liquid, a gas, a gas/liquid mixture, a liquid/solid mixture or a gas/solid mixture. These fluid chambers may take the form of pipes, conduits, tubes, or open channels for transporting fluids under the influence of gravity or of pumping systems, or they may take the form of vessels, tanks, or vats for carrying out various chemical or other processes. Monitoring process variables within a fluid chamber is a key component of overall process assessment and control, and such assessment and control may require injection and/or extraction of materials to or from the chamber. While access ports for measurement and control may be designed within a fluid chamber initially, such is not always the case. The introduction of continuous processing methods often requires the need to monitor process and product conditions in-line using various types of sensors.

There are numerous challenges to designing access devices for fluid chambers, particularly for industries processing food, drinks, pharmaceuticals, and bio-products, for example. Industry standards require the design to conform to specific criteria in order to be approved for sanitary applications. Such, access devices should be designed to maintain hygienic conditions in the area where the access device penetrates the fluid chamber. Maintenance of hygienic conditions is promoted by not having crevices or voids where process products may collect and stagnate creating biological risks.

In addition to the hygienic risk from product entrapment in voids during normal processing, such voids can also entrap products during draining procedures, and form pockets or voids that collect gases during filling and startup procedures. This is particularly true for highly viscous fluids that do not easily drain by gravity and require substantial pressure to create steady flow through the process.

Accordingly, the access device should be robust and designed such that both the device and a seal that is used to seal the device to the fluid chamber can be securely held in place without the pressure within the chamber compromising the integrity of the connection. Additionally, the design of a hygienic process connection has to be simple and capable of being easily disassembled for inspection and cleaning purposes.

Figure 1:
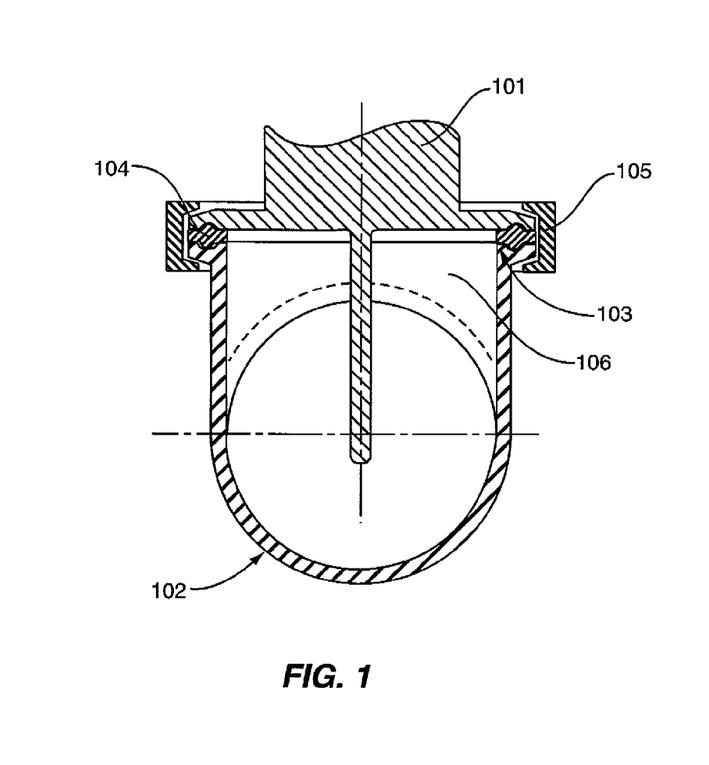
FIG. 1 is a cross-section view showing a state-of-the-art hygienic process connection assembly with the sealing mechanism and stagnant zone.
Figure 2:
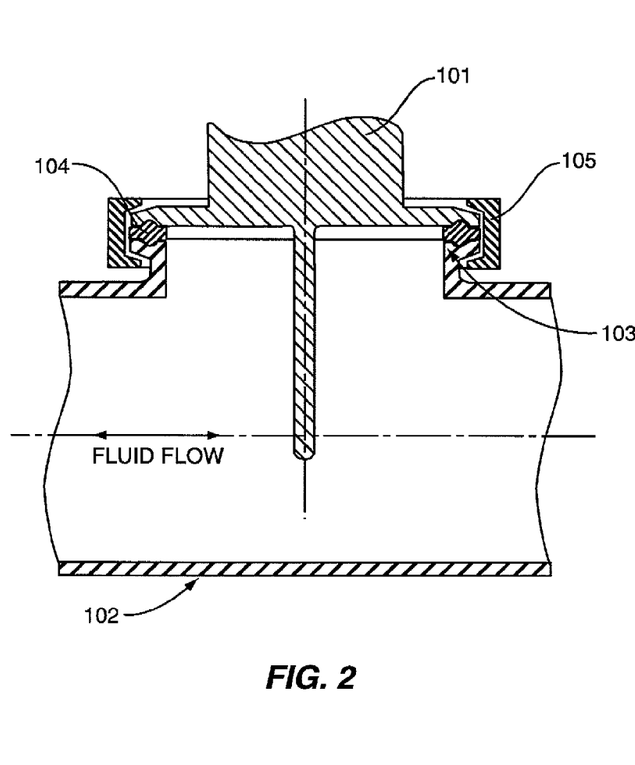
FIG. 2 is a longitudinal section view showing a state-of-the-art hygienic process connection assembly with the sealing mechanism and stagnant zone.

There are known devices that are designed for gaining access to fluid chambers used for processing/conveying fluids under hygienic requirements. FIGS. 1 and 2, for example, illustrate a conventional method for inserting a sensor into a hygienic processing pipeline. Such devices are provided with an elastomeric seal 104 for forming a sealed relationship between the access device 101 and the edge of an opening 103 in the fluid chamber 102. The design of these connection assemblies is generally that, when installed, the seal 104 lies between the wall of the chamber 102 and the access device 101 to be inserted in the chamber. When the access device 101 is installed, a clamping ring 105 compresses the seal 104 axially between the surface of the chamber 103 and the access device 101.

The geometry of the access device in the vicinity of the chamber opening where the seal is located can introduce localized zones of fluid stagnation 106 within the chamber. These zones can have a negative hygienic impact on the fluid contained within the chamber since they cannot be effectively cleaned in situ by routine Clean-In-Place (CIP) procedures. This often results in the need to dismantle the support structure and access device in order to carry out manual cleaning procedures on the dismantled components at frequent intervals. These procedures are both labor intensive and time consuming.

Another disadvantage of this kind of access device installation geometry is the restriction it places on the choice of installation location within the process. For example, the non-vertical orientation of the access device 101 can result in incomplete fluid drainage on shutdown procedures, and create voids or pockets that can trap gases during filling and startup procedures. Both can result in product contamination and waste. Further, restricting the angular orientation of the access device 101 in an attempt to reduce the fluid drainage problems invariably worsens the gas entrapment problem.

A further problem encountered by the known forms of access device 101 is that an increase in the fluid pressure within the chamber will have a tendency to move the access device 101 away from the seal 104 and the chamber opening 103 resulting in a reduction in the compression of the seal 104. This produces an increased hygienic risk from fluid ingress into the seal 104 contact areas, as well as leakage of the product out of the chamber.

SUMMARY

The present invention is a device, referred to as a connector assembly, which permits easy access to a fluid chamber and forms a substantially fluid tight seal between the device and the fluid chamber. In contrast to the method employed in conventional devices, whereby the seal is established outside the fluid chamber, the method employed by the present invention establishes the seal within the interior of the fluid chamber. The resultant advantages of this approach will become apparent from the following detailed description and drawings.

The device includes an insert that projects through a simple opening in the chamber. A seal is disposed around the insert and between spaced-apart compression members. At least one of the compression members is movable with respect to the other for compressing the seal. The seal extends beyond the opening such that a portion of the seal is disposed within the fluid chamber. When the device is installed, the insert and seal are positioned such that the seal lies in the opening of the chamber. Axial compression of the seal causes the seal to radially expand and form a fluid tight seal between the seal and the wall of the opening into the chamber, and between the seal and the body of the insert.

The present invention also provides a method of gaining access to a fluid chamber through a simple opening in the chamber. This method includes providing access to the fluid chamber by projecting an insert through the opening in the fluid chamber. A seal extends around the insert and is positioned such that the seal projects axially through the opening into the fluid chamber. The method includes creating a fluid-tight seal between the insert and the wall of the opening by axially compressing the seal. This causes the seal to be forced radially against the wall of the opening, and compresses the end and bore of the seal against the insert.

Other objects and advantages of the present invention will become apparent and obvious from a study of the following description and the accompanying drawings which are merely illustrative of such invention

DETAILED DESCRIPTION OF EXEMPLARY EMBODIMENTS

With reference to the drawings, the present invention is a connector assembly, indicated generally by the numeral 10 that provides access to a fluid chamber 20 having a chamber wall 22. As discussed herein, the connector assembly 10 is described in the context of being used in a hygienic application. However, this is for illustrative purposes only. Those of ordinary skill in the art will readily appreciate that the present invention may also by employed in conjunction with non-hygienic applications.

Figure 3:
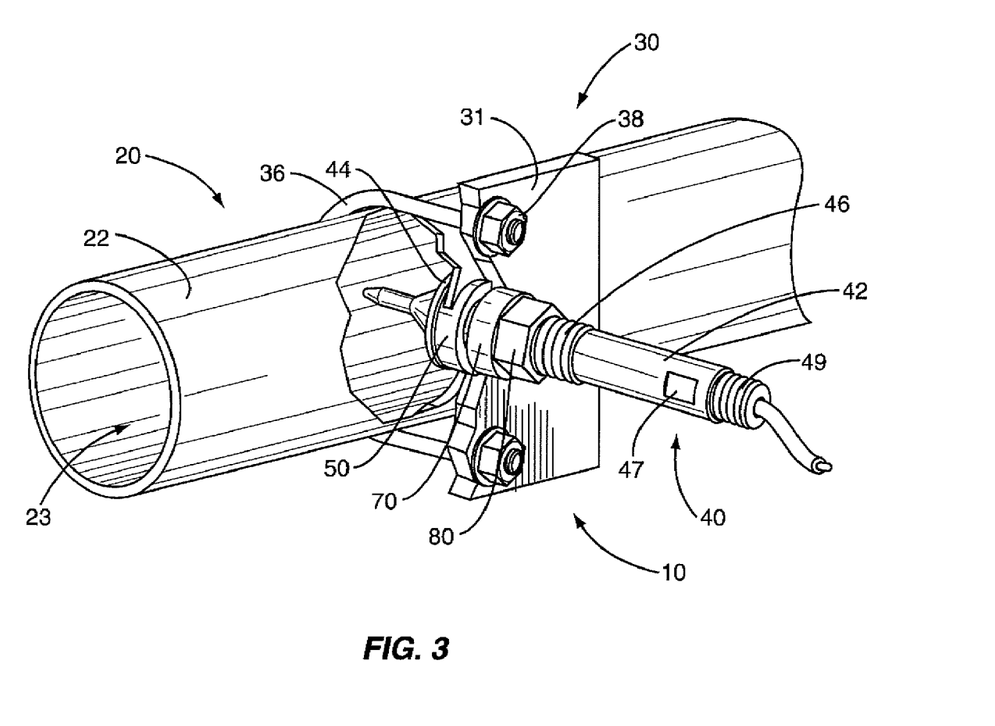
FIG. 3 is a perspective view of the connector assembly installed on a pipe.
Figure 4:
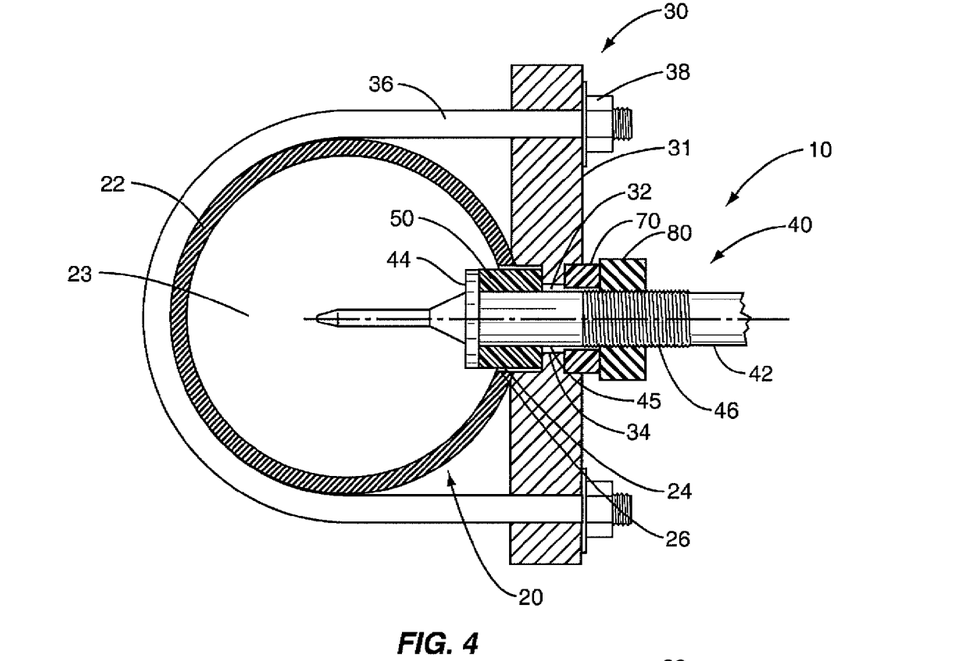
FIG. 4 is a sectional view of the connector assembly showing the seal thereof in an uncompressed state.
Figure 5:
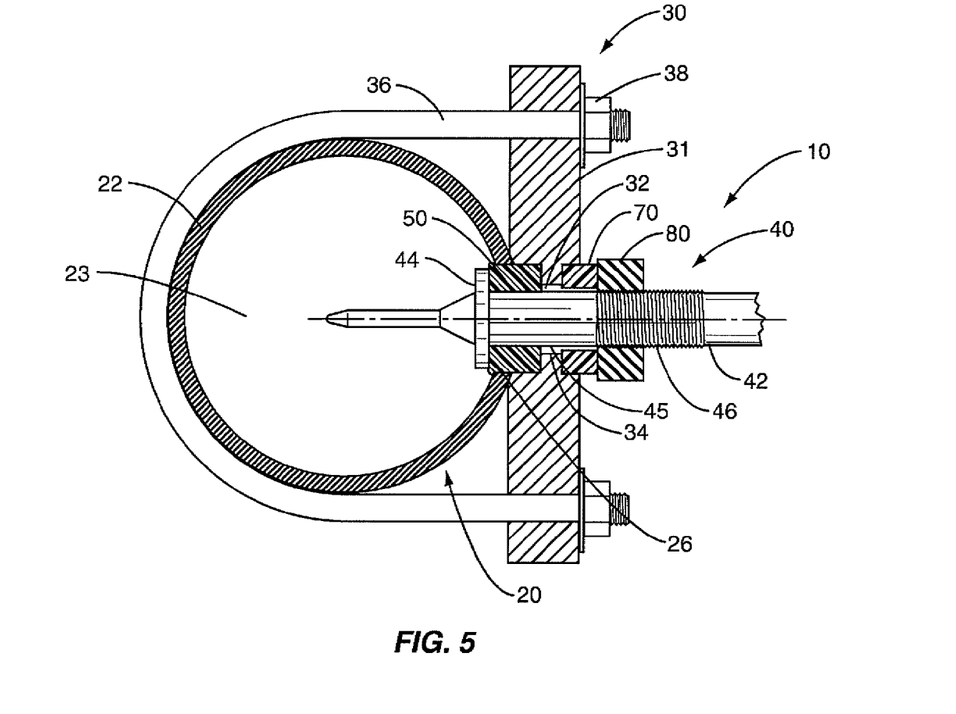
FIG. 5 is a sectional view of the connector assembly showing the seal thereof in a compressed state.

FIGS. 3-5 illustrate a first embodiment of the connector assembly 10. The connector assembly 10 comprises an insert 40 adapted to pass through an opening 24 into the fluid chamber 20, a support assembly 30 to support the insert 40, a seal 50 disposed around an outer surface 45 of the insert 40 to seal the opening 24 into the fluid chamber 20, and a compression mechanism to compress the seal 50. When the seal 50 is axially compressed, the seal 50 radially expands and contacts the wall 26 of the opening 24 into the fluid chamber 20 as well as compressing the end of the seal 50 against the insert flange 44 and the seal bore against the insert body 45 to form a hygienic and fluid tight seal. The connector assembly 10 is designed so that positive pressure inside the fluid chamber 20 enhances the seal that is formed. Additionally, the connector assembly 10 is designed to minimize biological contamination risks and the transfer of thermal or electrical energy from the wall 22 to the insert 40.

The support assembly 30 comprises a support member 31, one or more U-bolts 36, and mounting nuts 38. Support member 31 has an opening 32 through which the insert 40 can be assembled via the proximal end of the insert. Mounting holes to accept the ends of U-bolts 36 are disposed on opposite sides of the opening 32. Support member 31 is positioned adjacent to fluid chamber 20 such that throughway opening 32 aligns with opening 24 in the chamber. The surface of the support member 31 facing the fluid chamber 20 may be contoured or machined so that it conforms to the shape of the fluid chamber 20 and provides a surface-to-surface contact. The support member 31 is secured to the fluid chamber 20 with the U-bolt 36 and pair of mounting nuts 38. If desired, more than one U-bolt 36 or other form of clamping device can be used.

The insert 40 may comprise a measurement probe, thermowell, or sleeve, or similar structure that extends into the fluid chamber 20. Insert 40 has a generally cylindrical body 42 with a flange 44 at the distal end. A portion of the outer surface 45 includes threads 46. Wrench flats 47 on the body 42 facilitate gripping the insert and preventing it from turning during installation or removal as hereinafter described. The proximal end of the insert 40 may have external threads 49 to provide a means of making a measuring signal connection or other conduit (not shown). For illustrative purposes, the complementary compression surfaces of the flange 44 and the end of the seal 50 are shown as plain surfaces. However, those skilled in the art will appreciate that other surface profiles and bonding methods could be used.

Disposed on insert 40 is a compressible seal 50. Seal 50 has a generally annular shape with a central opening sized such that the seal 50 fits snugly around the insert 40. As seen in the drawings, when the connector assembly 10 is secured to the chamber 20, the insert 40 is positioned such that the seal 50 is disposed within the opening 24 in the fluid chamber 20 and such that a portion of the seal 50 extends into the interior 23 of the fluid chamber 20. When axially compressed as described below, the seal 50 radially expands to form a fluid-tight seal with the wall 26 of the opening 24, as well as with the insert flange 44 and the seal bore against the insert body 45. A portion of the seal 50 contacts the wall 26 of the opening. The portion of the seal 50 extending into the fluid chamber 20 expands beyond the wall 26. The diameter of the portion of the compressed seal 50 extending into the fluid chamber 20 is greater than the diameter of the opening 24. The profile of the opening 24 and seal 50 are shown as circular in shape, although other geometries are possible.

The compression mechanism for compressing the seal 50 comprises first and second compression members disposed on opposite ends of seal 50 and an actuator 80 to squeeze the seal 50 between the compression members. At least one of these compression members is movable for engaging and compressing the seal 50. In the embodiment illustrated in FIGS. 3-5, the flange 44 on the insert 40 functions as the first compression member. A shoulder 34 within the opening 32 of the support member 31 functions as the second compression member. The actuator 80 comprises a threaded nut 80 that engages with the external threaded portion 46 of the insert 40. A bushing 70 may be inserted between the actuator 80 and the support member 31 to provide electrical and/or thermal isolation for the insert 40 when made from non-conductive material. The actuator 80 is rotated in a direction such that the bushing 70 is driven into contact with the support member 31. Further rotation of actuator 80 retracts insert 40 and compresses seal 50 between the flange 44 and the shoulder 34 in the support member 31. The threaded portion 46 ends at a point along insert 40 in order to pre-compress the seal 50 by a pre-determined amount.

The geometry of the flange 44 produces compressive forces that are generally perpendicular to the end surface of the seal 50. The elastomeric properties of the seal 50 cause it to expand radially when compressed axially. The radial expansion of the seal 50 occurs in a manner substantially perpendicular to the wall 26 of the opening 24, thereby creating a uniform seal between the insert 40 and the wall 26 of the opening 24. The compression of the seal 50 by the insert 40 also forms a fluid-tight and hygienic seal between the flange 44 and the end surface of the seal 50.

Because the fluid-tight and hygienic seal is formed between the seal 50 and the wall 26 of the opening 24, the effectiveness of the seal is independent of the surface curvature of the chamber 20. This permits the device to be inserted into small diameter chambers whose radius is smaller than the diameter of the opening 24.

The support member 31 is designed such that, once attached, the second compression member is immovably fixed to the fluid chamber 20. This ensures that the compression forces on seal 50 are maintained under varying pressure conditions within the chamber 20. At the same time, since opening 32 in support member 31 is smaller than the diameter of the flange 44 on insert 40, insert 40 is prevented from being ejected from the chamber 20 as a result of excess pressure within the chamber 20.

When installed, the connector assembly 10 provides a hygienic connection into the fluid chamber 20 without voids, pockets or crevices that enables the connection assembly 10 and fluid chamber 20 to be collectively installed at any angular orientation without any risk of gas entrapment during filling and product hold-up after drainage.

Figure 6:
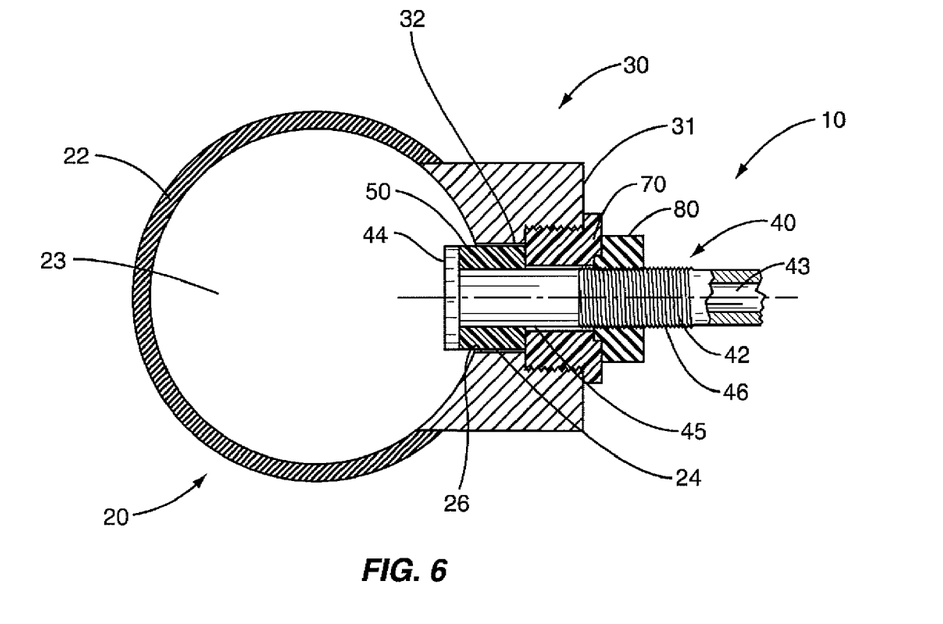
FIG. 6 is a sectional view of an alternate embodiment of the connector assembly showing the seal thereof in an uncompressed state.
Figure 7:
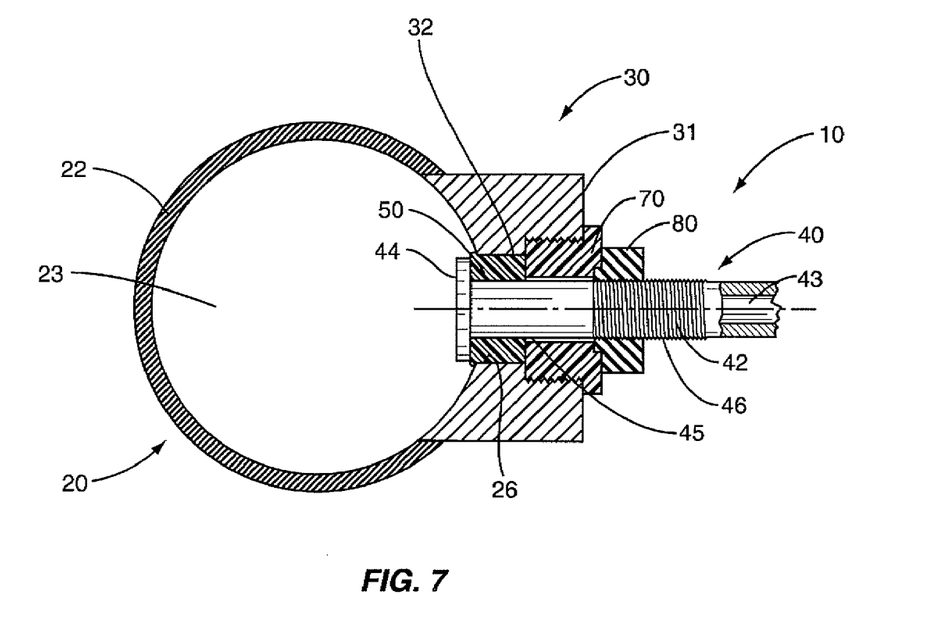
FIG. 7 is a sectional view of an alternate embodiment of the connector assembly showing the seal thereof in a compressed state.

FIGS. 6-7 illustrate a second embodiment that is similar in most respects to the first embodiment. For clarity, the reference numbers used to denote components of the second embodiment are the same as the first embodiment where the components are similar. Detailed descriptions of components previously described are omitted. For brevity, the second embodiment is described below by highlighting the differences from the first embodiment.

An object of the second embodiment is to allow the insert 40 to be installed and removed without dismantling the support member 31 from the chamber. The insert 40 in this embodiment comprises a sleeve with an axial opening 43 providing access to the interior of the fluid chamber 20. The throughway opening 32 in the support member 31 is enlarged enough to allow passage of the insert 40. The support member 31 in this embodiment comprises a mounting block that is integrally formed with the fluid chamber 20, or is permanently affixed to the fluid chamber 20, such as by welding. Those skilled in the art will appreciate that a removable support member 31, as shown in FIGS. 3 and 4, could also be used.

In the second embodiment, the bushing 70 is designed to engage the seal 50, and function as the second compression member. Bushing 70 includes threads which engage mating threads in the support member 31. The bushing 70 is tightened to prevent the bushing 70 from moving axially relative to the support member 31. Seal 50 is thus positioned directly between flange 44 and bushing 70. The bushing 70 can also provide electrical and/or thermal isolation for the insert 40 when made from a non-conductive material.

The second embodiment functions in substantially the same manner as the first embodiment. The actuator 80 comprises a nut that is tightened to compress the seal 50 as shown in FIG. 5. When the seal 50 is axially compressed, it expands radially into contact with the inside wall 26 of the opening 24 into the fluid chamber 20, and compresses the end of the seal 50 against the insert flange 44 and the seal bore against the insert body 45. The threaded portion 46 limits the travel of the actuator in order to pre-compress the seal 50 by a predetermined amount.

When installed, the connector assembly 10 provides a hygienic connection into the fluid chamber 20 without voids, pockets or crevices. This enables the connection assembly 10 and the fluid chamber 20 to be collectively installed at any angular orientation without any risk of gas entrapment during filling and product hold-up after drainage. To remove insert 40, actuator 80 is rotated to release the pressure on the seal 50. Due to the natural resiliency of the material, the seal 50 will contract so that the insert 40 and seal 50 can be withdrawn easily from the fluid chamber 20 by removing the bushing 70. The insert 40 can be repeatedly inserted, compressed and subsequently withdrawn multiple times without detriment to the seal performance.

Various materials may be used to manufacture the connector assembly 10 of the present invention. In some applications it may be desirable to isolate components of the connector assembly 10 from thermal and/or electrical conditions in the wall 22. For example, seal 50 may include material having a low thermal conductivity to minimize the thermal energy transmitted through the seal. Similarly, selecting a material for seal 50 having high electrical resistance will inhibit the transmission of electrical energy. In a similar fashion, insert 40, bushing 70, actuator 80 and/or support member 31 may be partially or completely formed from thermal or electrical isolating material to prevent transfer of thermal or electrical energy from the wall 22 through the support member 31 to the insert 40, or from the portion of the insert that is outside the fluid chamber 20 to the sensing end of the insert 40 that extends beyond the sensor flange 44 into the fluid chamber 20.

In use, the connector assembly 10 is inserted into the opening 24 in the fluid chamber 20 and the actuator 80 is tightened by rotating the actuator 80. Rotation of the actuator 80 causes the insert 40 to move axially such that the seal 50 is compressed between the first and second compression members. The seal 50 radially expands when it is axially compressed. This radial expansion of the seal 50 creates a generally fluid-tight seal between the wall 26 of opening 24 and outer surface 45 of the insert 40. It also compresses the end of the seal 50 against the insert flange 44 and the seal bore against the insert body 45.

As illustrated the fluid-tight seal provided effectively isolates fluid contained in the fluid chamber 20 from contact with exterior surfaces of the chamber. Moreover, no voids or crevices are created within the chamber that would give rise to stagnant fluid zones. The absence of voids and crevices makes it possible to undertake clean-in-place (CIP) practices to ensure hygienic operating conditions. In addition, if the pressure within the chamber increases, the increased pressure will further compress the seal 50, which enhances the fluid-tight seal.

Figure 8:
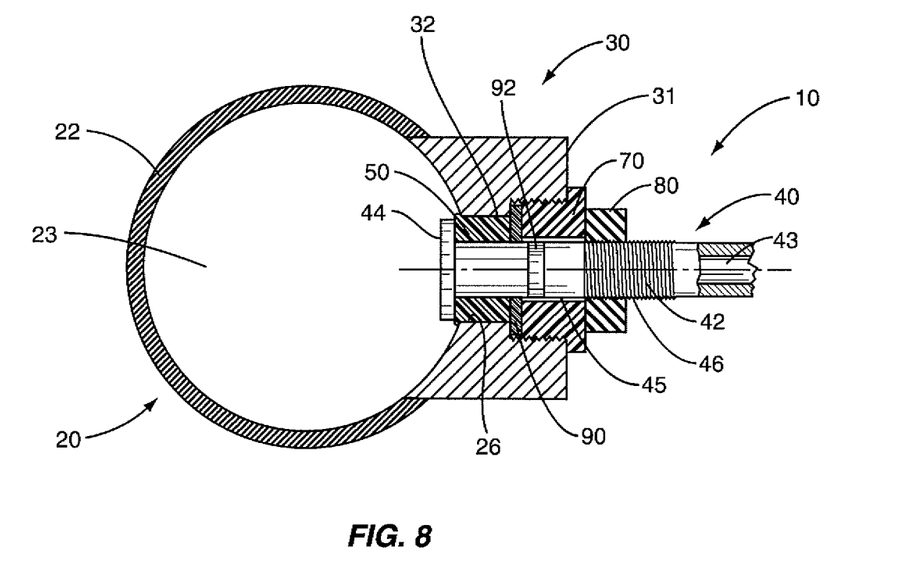
FIG. 8 is a sectional view of another embodiment of the connector assembly.

FIG. 8 is a sectional view illustrating another embodiment of the connector assembly 10. In this embodiment, the connector assembly 10 also includes a thermally conducting collar 90 and a thermally isolating barrier 92. The collar 90 transmits thermal energy between the fluid chamber 20 and the adjacent section of the insert 40, thereby reducing the temperature gradient between the insert flange 44 lying within the fluid chamber 20 and the part of insert 40 in contact with collar 90. The collar 90 may be disposed, for example, around the body of insert 40 between the end of the seal 50 and the base of the bushing 70. The isolating barrier 92 may be constructed from a low thermally conductive material and may be integrated into the insert 40. The thermally conducting collar 90 and the isolating barrier 92 can function independently or collectively to restrict the flow of thermal energy between the insert flange 44 lying within the fluid chamber 20, and the remainder of the body of insert 40.

Figure 9:
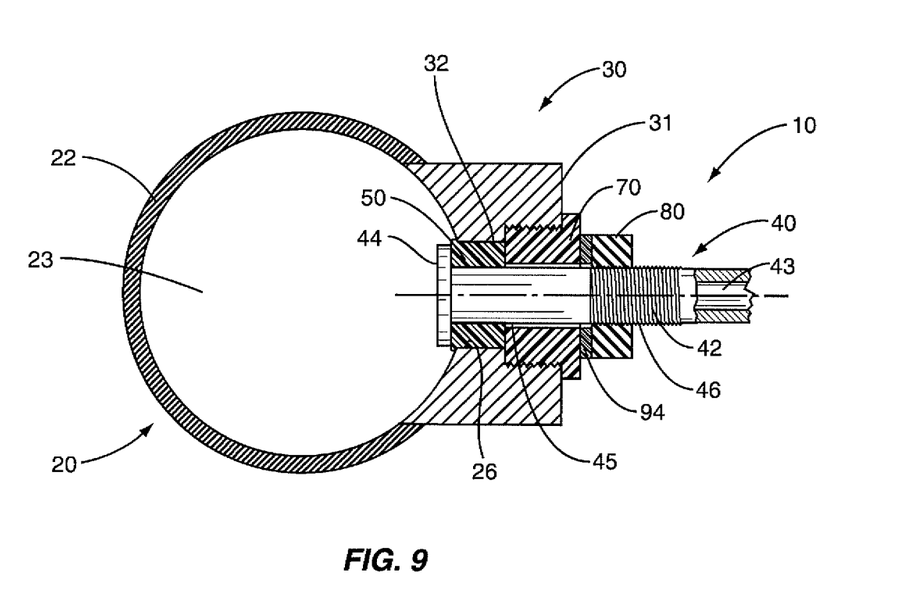
FIG. 9 is a sectional view of yet another embodiment of the connector assembly.

FIG. 9 is a sectional view illustrating another embodiment of the connector assembly 10. In this embodiment, the connector assembly also includes a seal thermal expansion relief member 94. The relief member 94 may be constructed from an elastic material and may be disposed between the actuator 80 and the bushing 70. The relief member 94 enables the seal 50 to axially expand and contract as a result of temperature variations within the fluid chamber 20 without adversely affecting the integrity of the sealing mechanism.

The connector assembly 10 of the present invention provides a device that permits access to the interior of a fluid chamber 20. The fluid chamber 20 may assume various forms, such as a pipe or vessel, and typically contains fluid being transported and/or undergoing some type of process. The fluid chamber 20 may be a closed system that totally isolates the fluid from the external environment, or the fluid chamber 20 could be an open vat or channel for directing the flow of a fluid. Installation into an "open" fluid chamber operating at near atmospheric pressure could also be achieved without the necessity for the support member 31 to be secured to the wall of the chamber.

In order to measure certain conditions within the fluid chamber 20, the connector assembly 10 permits access through the wall of a fluid chamber 20. For example, the insert 40 may comprise a measurement probe for monitoring conditions inside the fluid chamber, or a thermowell such that a sensor can be inserted into and removed from the chamber 20 while maintaining the processing conditions and hygienic integrity. In some cases, control and assessment of the processes being carried out within the fluid chamber 20 may require bleeding or siphoning material from the fluid chamber 20, or injecting material into the fluid chamber 20. In such cases, the insert 40 may comprise a sleeve with a fluid passage to allow material to be introduced into or removed from the fluid chamber 20. The present invention can also be used to make a fluid connection between the fluid chamber 20 and a fluid conduit.

The present invention may, of course, be carried out in other specific ways than those herein set forth without departing from the scope and the essential characteristics of the invention. For example, although the connector assembly 10 may be used to connect an insert into a fluid chamber 20 without compromising hygienic integrity, it may also be used in less critical, non-hygienic applications. In such cases, the present invention would form a radial, fluid-tight seal against the wall of the opening in the fluid chamber by axially compressing a seal within the fluid chamber interior. Accordingly, the present embodiments are therefore to be construed in all aspects as illustrative and not restrictive and all changes coming within the meaning and equivalency range of the appended claims are intended to be embraced therein.

What is claimed is:

1. An insert connector assembly, comprising:
   an insert adapted to project through an opening in the side wall of a fluid chamber such that a first portion of the insert lies within the fluid chamber;
   a seal having first and second ends and an axial opening for said insert, said seal being disposed around the insert for sealing a space between the insert and the wall of the opening in the chamber, wherein the length of said seal is greater than the length of said opening such that said first end of the seal extends beyond the opening into the fluid chamber;
   first and second cooperative compression members disposed on opposite ends of the seal for axially compressing and radially expanding the seal such that a generally fluid-tight seal is formed between the wall of the opening and the insert, and wherein the first compression member is integrally formed with said insert and is movable along a movement axis with respect to the second compression member to compress the seal; and
   a first seal contact surface on said first end of said seal, and engaged by said first seal compression member such that the compression forces generated by axial compression of the seal are perpendicular to the first seal contact surface.

2. The insert connector assembly of claim 1 further comprising an actuator to move the first compression member relative to the second compression member to compress and radially expand the seal.

3. The insert connector assembly of claim 2 wherein the second compression member is stationary.

4. The insert connector assembly of claim 3 wherein the first compression member comprises a flange integrally formed on the insert.

5. The insert connector assembly of claim 1 wherein the actuator moves the insert axially relative to the second compression member.

6. The insert connector assembly of claim 5 further comprising a support member to secure the insert to the fluid chamber.

7. The insert connector assembly of claim 6 wherein the second compression member is integrally formed with the support member.

8. The insert connector assembly of claim 6 wherein the support member is fixedly secured to the fluid chamber.

9. The insert connector assembly of claim 6 wherein the support member is removably attached to the fluid chamber.

10. The insert connector assembly of claim 6 wherein the support member is integrally formed with the fluid chamber.

11. The insert connector assembly of claim 6 wherein the second compression member comprises a bushing disposed between the actuator and the support member.

12. The insert connector assembly of claim 11 wherein the bushing threadably engages the support member.

13. The insert connector assembly of claim 2 wherein the actuator comprises a threaded member threaded onto the insert.

14. The insert connector assembly of claim 13 wherein the connector assembly is configured to limit the axial movement of the insert.

15. The insert connector assembly of claim 1 wherein the connector assembly is adapted to provide thermal and/or electrical isolation of the insert.

16. The insert connector assembly of claim 5 wherein pressure within the fluid chamber acts upon the first compression member to further compress the seal against the second compression member to enhance the fluid-tight seal.

17. The insert connector assembly of claim 5 wherein the first and second compression members interact to prevent the insert from being ejected from the fluid chamber due to excess pressure within the chamber.

18. The insert connector assembly of claim 5 wherein the first compression member applies an axial compression force to the first seal contact surface during compression.

19. The insert connector of claim 18 wherein the first and second compression members remain in contact with the ends of the seal during compression.

20. The insert connector assembly of claim 1 further comprising a thermally conducting collar to transfer energy between the fluid chamber and the body of the insert lying outside the chamber.

21. The insert connector assembly of claim 1 further comprising a thermal expansion relief member to allow axial expansion and compression of the seal resulting from temperature variation within the fluid chamber.

22. The insert connector assembly of claim 18 whereby when the seal is compressed, the first compression member, the circumferential surface of the seal inside the fluid chamber and the inside wall of the chamber adjacent to the opening collectively form a continuous surface without voids or crevices.

23. The insert connector assembly of claim 1 wherein the insert comprises one of a sensor, a thermowell, or a conduit.

* * * * *